June 30, 1936.  F. HOLMES  2,046,307
ELECTRIC METER
Filed July 16, 1934  2 Sheets-Sheet 1
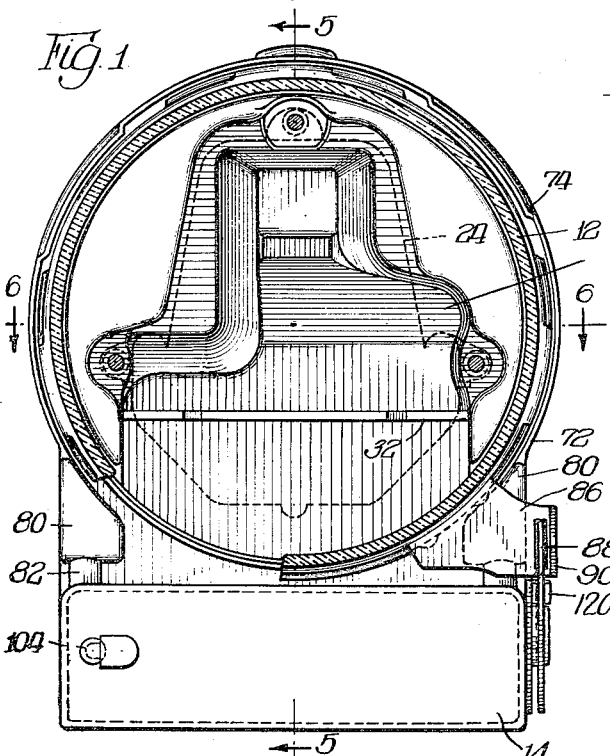
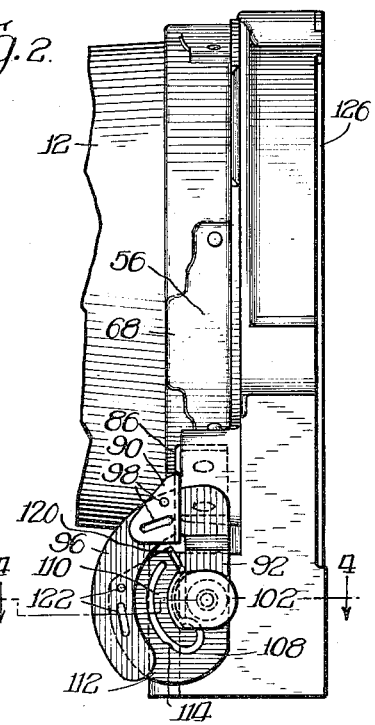
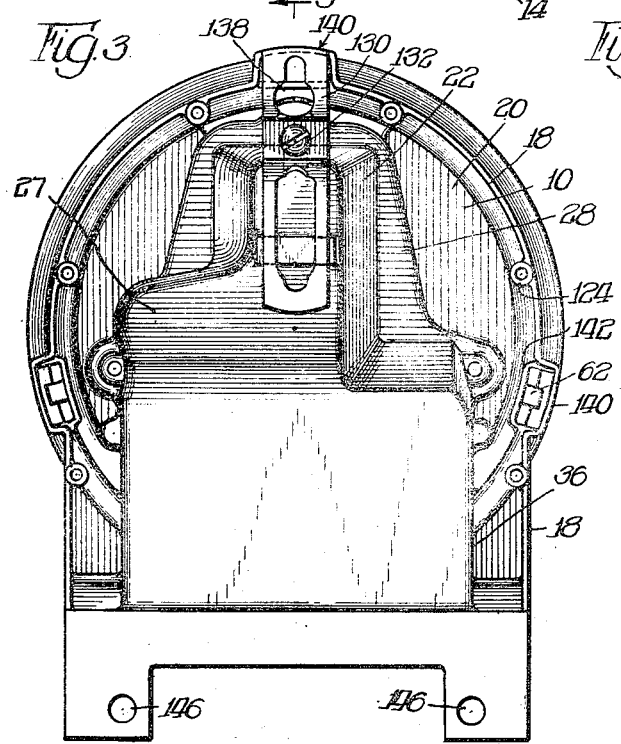
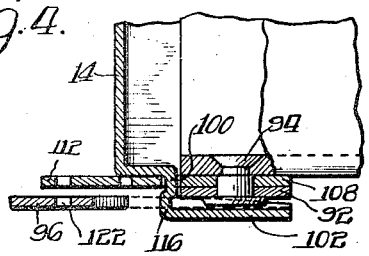
Inventor:
Frederick Holmes,
By Wilkinson, Huxley, Byron & Knight attys.

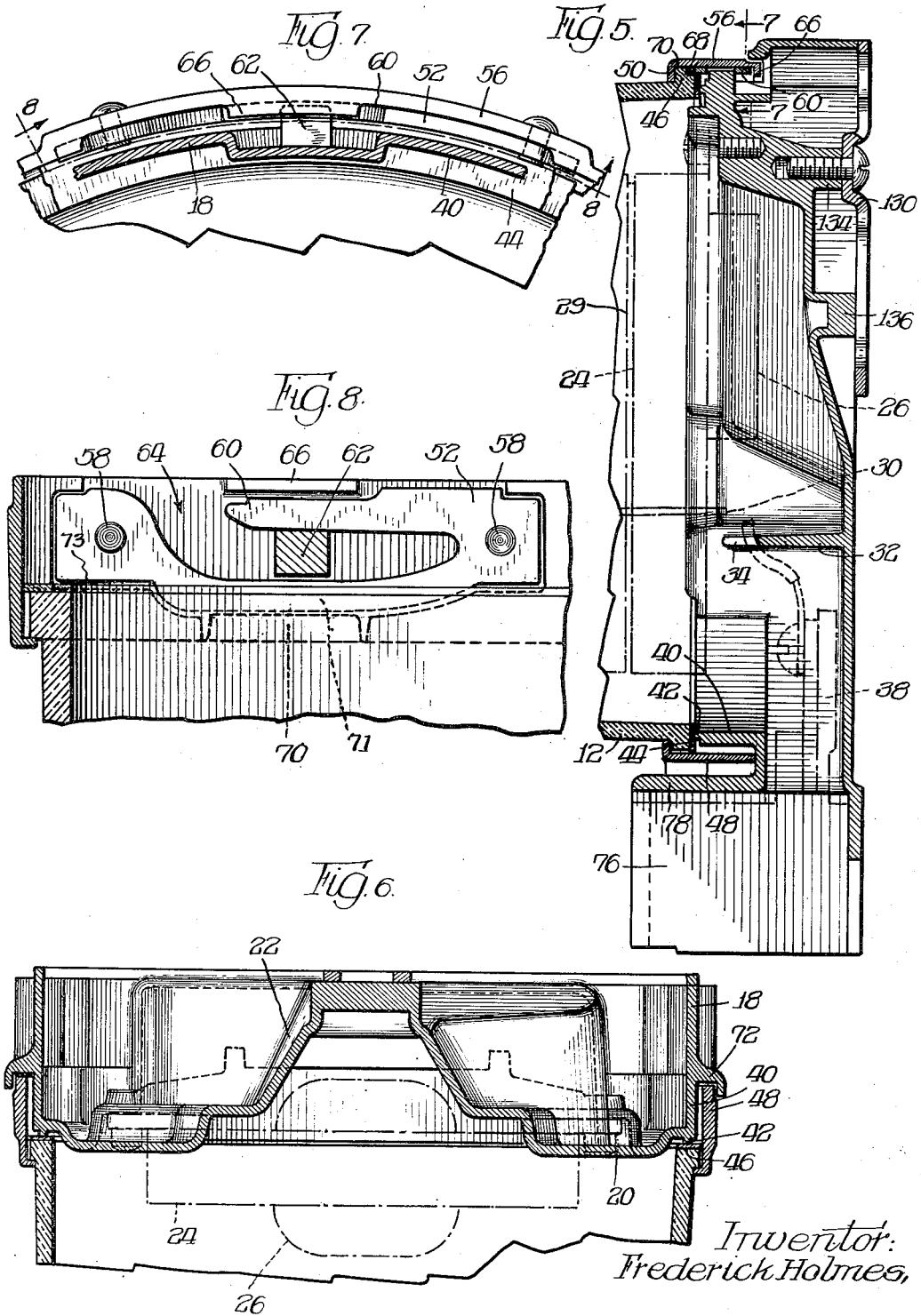

Patented June 30, 1936

2,046,307

UNITED STATES PATENT OFFICE 2,046,307

ELECTRIC METER

Frederick Holmes, La Fayette, Ind., assignor to Duncan Electric Mfg. Co., La Fayette, Ind., a corporation of Illinois Application July 16, 1934, Serial No. 735,312

16 Claims. (Cl. 171—34)

This invention relates to electric meters, and more specifically to the base and cover for watthour meters. In its preferred form it comprises a cast metallic base having separated inner and outer walls so shaped and arranged as to resist tampering, and a glass cover removably secured to said base, the joint between said cover and said base being protected against tampering.

Electricity thieves are often both ingenious and persistent in their efforts to so tamper with a meter or its connections as to be able to use more current than the meter registers. Although thieves of this type comprise only a small part of the population, yet the number of them would probably surprise anyone outside of the electric industry. Meter manufacturers have long had the practice of sealing meters closed by means of a wire, the two ends of which are sealed in a button of lead which would indicate any tampering therewith. As is well known, the loop of wire thus formed would tie together two elements the separation of which is necessary in order to remove the cover of the meter. It has also been the practice for some time to enclose the wires from the supply lines in piping and to house in a metal box the connections of these lines to the meter. These precautions, however, have not prevented drilling through the meter base or working a hole between the meter base and its cover through which a wire, spider eggs, metal filings, or other improper articles could be inserted. In connection with spider eggs it may be explained that one ingenious method of stealing electricity is to poke spider eggs into a meter on a straw, the heat of the meter hatching the eggs, after which the spiders sometimes weave a web which retards the meter disk. Efforts have been made to minimize such practices, and it is the object of the present invention to provide a base and cover in connection with the watthour meter and so constructed and joined as to make tampering with the meter more difficult than ever before, while at the same time providing an economical structure from the standpoint of manufacturing cost.

In accomplishing this main object it is a further object to provide a meter base having an inner wall spaced well inside of the outer wall and so inclined at the more dangerous points as to make drilling very difficult. It should be understood that when the point of the drill cannot be held against slipping it is very difficult to drill at an angle to the surface of the wall. Furthermore, even if the electricity thief succeeds in drilling through both walls he would find it very awkward trying to manipulate a wire through the spaced holes, and if he tries to insert spider eggs, metal filings or the like, they are likely to drop off the piece of straw or wire before the hole in the second wall is located.

It is a further object to provide other protection for such parts of the meter as are not protected by the inclined inner wall, as by locating these less protected points where they will be clearly visible, or adjacent such invulnerable parts of the meter element as the laminated iron core of the actuating magnets.

An additional object is to provide such a tortuous path for the insertion of any improper implement through the joint between the meter base and meter cover as to make such insertion nearly impossible.

It may be noted that in spite of the accomplishment of the numerous objects, yet the metal base is of a structure which may be very easily cast and is formed of a uniform and economical yet sufficient thickness except where there is some special reason for added strength.

An additional and somewhat independent object of the invention is to provide more efficient and trouble-free means for sealing the meter closed and also for sealing closed the cover of the terminal chamber, than has heretofore been known.

It is also desired to locate the walls as far apart as practical so that even if holes are drilled through both walls the manipulation of any wire therethrough will be extremely difficult.

With these and various other objects in view, the invention may consist of certain novel features of construction and operation, as will be more fully described and particularly pointed out in the specification, drawings and claims appended hereto.

In the drawings, which illustrate an embodiment of the invention, and wherein like reference characters are used to designate like parts, Figure 1 is a front view partially in section of the meter casing with the covers in place;

Figure 2 is a fragmentary side view of the same;

Figure 3 is a rear view of the meter base;

Figure 4 is a fragmentary view showing the arrangement of the sealing links;

Figure 5 is a vertical sectional view of the meter casing taken through the line 5—5 of Figure 1;

Figure 6 is a horizontal sectional view of the meter casing taken through the line 6—6 of Figure 1;

Figure 7 is a fragmentary and partly sectional vertical view showing the means for attaching the glass cover to the base; and Figure 8 is a fragmentary sectional view along the line 8—8 of Figure 7.

Although the invention may take many forms, only one has been chosen for illustration. In this form the meter casing comprises a base 10, a glass cover 12, and a terminal box cover 14. Special means are provided for attaching and sealing the two covers to the base. The structure of the base itself comprises one of the major aspects of the invention. This base is preferably cast from any suitable material, as aluminum, but it may be formed in any other way desired. The general nature of its structure is perhaps shown best by the rear view, Figure 3, in which it is seen that it is provided with an outer wall 18 and front wall 20 and an inner wall 22. It will be noticed that the inner wall 22 is spaced as far as is practical from the outer wall 18 and that it is for the most part a sloping wall, preferably being neither parallel to the outer wall 18 nor perpendicular to the structure on which the meter is to be supported. Because of this sloping and spacing, it is extremely difficult to drill through the outer wall and on through the inner wall, especially if the drill is fine enough not to leave quickly detected holes. Likewise the wide spacing of the walls makes it difficult to thread a wire through small holes in the two walls, and makes it virtually impossible to insert anything such as filings or spider eggs through the holes.

For the sake of clarity in showing the base, the meter element has been indicated only by showing dotted lines for the parts most closely concerned with the structure of the base. Thus, in Figures 1, 5 and 6, the dotted line 24 represents the outer edges of the meter core, while the dotted line 26 represents the edges of one of the coils on this core. From Figure 6 it will be seen that the inner wall 22 is located in the close vicinity of the coil 26, thus being as far from the outer wall 18 as space requirements of the meter will permit. It may be explained that the bulge 27 is provided to make room for an adjusting device which the present applicants desire to use.

In order to keep the front wall 20 as far forward as desirable, while permitting the meter element to be as far back as possible, the front wall is provided with a core depression 28. It will be noted that the sides of the depression are not as steeply sloped as the wall 22, but inasmuch as a person drilling through the wall of this depression 28 would merely strike the laminated core, this is not a particularly vulnerable point. It is very desirable to have the front wall located well forward as shown, and therefore to have the space between the inner and outer walls extend forward in or at least as far as the cover member, so as to leave no zone for drilling between the double wall zone and the cover member. Likewise it is preferred that except for such relatively invulnerable parts as the core, the front wall 20 be left clear and visible to make any holes there more readily detected. To this end the meter framework (indicated by dotted lines 29) is preferably about the shape of the core, in front view, and mounted in front thereof.

Below the sloping inner wall 22 (which may be called the coil chamber) the inner wall is necessarily enlarged to make room for the meter disk indicated by the dotted line 30, connecting wires, and an adjustment device previously mentioned. Some additional protection may be furnished to this zone of the meter if desired by the provision of a bridge wall 32 below the level of the meter disk 30. This bridge wall 32 may be provided with suitable notches 34 through which the connecting wires may be passed. Even below this bridge partition the meter is preferably protected by a double wall construction, the outer wall 18 and the inner wall 36 being placed as far apart as is practical. Because it is desired to have a connection block indicated by dotted line 38 located in the portion of the base below the bridge 32, it will usually be impractical to make the walls 36 slanting without carrying them too close to the outer walls 18. However, because of the flat and visible nature of this portion of the wall a hole therethrough would usually be readily detected. The forward portion 40 of the outer wall 18 (distinguished best in Figure 6) forms an annular shoulder about which the cover unit is telescoped, as is described below. This annular shoulder 40 substantially follows the contour of the glass cover 12, as shown in Figure 1. Along the front face of this shoulder 40 is preferably provided a narrow annular sealing seat 42, against which rests the glass cover member 12 or an annular sealing gasket 44.

The cover unit comprises not only the glass cover member 12, which has formed thereon an outwardly extending annular flange 46, but also the flange or collar 48 which is provided with an inwardly extending annular flange 50 which interlocks with the annular flange 46. There are also provided clamps 52, preferably of the bayonet type as shown, and if desired the sealing gasket 44. The bayonet clamps 52 preferably lie substantially flush with the main portion of the collar 48 as shown in Figure 7, the collar 48 being pressed out to form a housing 56 in which the clamp 52 is located. This clamp may be secured by a pair of rivets 58 extending through the collar 48 and includes a bayonet portion 60 which may be called the active portion of the clamp. As the cover is inserted in place, a lug 62 formed on the wall 40 of the base passes through the opening 64 in the bayonet clamp, whereupon rotation of the cover in a clockwise direction thrusts the bayonet member 60 behind the lug 62, whereby the cover is held in place. Inasmuch as the bayonet member 60 is resilient, the cover may be turned to the proper position, and it, together with the sealing gasket 44, will be held firmly seated on the annular seat 42. The cover will normally be locked against turning by means to be described, and to prevent its being pried off by excessive bending of the bayonet 60 a lug 66 or other stop may be provided on the collar 48. It may be mentioned in passing that to prevent the glass cover member 12 from turning in the collar 48; or slipping out of it, the housing 56 is provided with a forward portion 68 into which extends a lug 70 formed on the glass cover member 12 and extending beyond the outwardly extending flange 46. This lug interlocks with the housing portion 68 to prevent turning and is engaged by the backbone 71 of the clamp 52 to prevent the glass from slipping out of the collar. In like manner the gasket 44 may be held in place by lugs thereon extending into the spaces 73 between clamps 52 and the glass.

Certain special features are provided for making the path between the cover unit and the meter base tortuous to make tampering with the meter more difficult. The tortuousness of this path is probably best shown in Figure 6. An outwardly extending upwardly flanged arm 72 is provided all around the cover unit, except where there are other upstanding members. The flange on this rim may slant or extend inwardly close to the band 48, as shown at 74, and at any points where its doing so will not interfere with the movement of the cover. This obviously makes the insertion of a wire beyond the collar member 48 extremely difficult. Even if this difficulty is overcome, the tight contact between the seat 42 and the washer 44 or between the washer 44 and the cover member 12 offers high resistance to penetration, and after this has been penetrated the front wall 20 being located forwardly of the edge of the cover member 12 forms another obstruction.

The lower part of the meter is provided with an enlargement forming a terminal chamber 76. The upper wall 78 of this terminal chamber extends considerably forward of the edge of the glass cover member 12 so that entrance to the meter from the bottom is extremely difficult. To protect the meter from the otherwise less protected points above the right and lefthand ends of the wall 78, corner posts 80 may be provided. Even the space between the corner posts 80 and the wall 78 is protected by a raised rib 82 which has the primary function of receiving a screw from inside the terminal chamber for holding the connection block 38 in place.

For locking the cover in place, the cover is provided with a sealed bracket 86 which may be formed as a part of the collar 48 or secured thereto. This bracket is provided with a hole 88 passing therethrough and with a lug 90 extending forwardly therefrom. The pivoted sealing lever 92 is pivoted to the terminal chamber portion of the meter base, as by a suitable pin 94. The lever 92 is provided with an arcuate arm 96 which passes through the hole 88 when the cover is in its secured position. Sealing holes and slots 98 are provided in the lug 90 and the arm 96 to permit the passage of a sealing wire therethrough whenever it should be desired to seal the cover closed without sealing the terminal chamber closed, as is described below.

The terminal box cover 14 is secured at its left end by a headed rivet 104 secured to the base and engaging a slot in the cover 14. At the righthand end the cover 14 is secured by a second pivoted sealing lever 108 which is also pivoted on the pin 94. This sealing lever engages a lug or extension 100 which in turn is provided with a rearwardly extending shield 102 extending over and around the head of the pin 94 to protect the same from tampering. The lever 108 is provided with a resiliently constructed, arcuately shaped arm 110 which presses resiliently on the extension 100 on the cover 14. Undue yielding of the resilient arm 110 is prevented by the outer arm 112 on which the arm 110 is formed, and which may be provided with a knob 114 for more narrowly limiting the resiliency of the arm 110 at its end, if desired. The extension 100 is provided with a forwardly extending flange or hump 116 which prevents prying the arm 110 laterally from its proper position. The lever 108 may be provided with a laterally extending lug 120 which simultaneously strengthens the connection between the arms 110 and 112 and forms a handle for operation of the lever 108. Sealing holes and slots 122 are provided through the arms 96 and 112 so that a sealing wire may be passed through these arms to seal them both in the position shown in Figure 2, thus preventing removal of either the cover member 12 or the cover member 14. If it should be desired to seal the lever 108 without sealing the lever 92 this may be accomplished by providing a sealing lug on the cover 14 having holes which will register with the holes 122 in the arm 112.

On the inside of the outer wall 18 are formed several ribs or knock-out pins 124 which serve to facilitate removal of the cast base from the mold. In some instances it is preferred that these ribs be provided with screw holes and that the backing plate 126 be screwed to these ribs to make access to the meter from the back more difficult. For the sake of clarity, and since such plate will not ordinarily be necessary, it has been shown only in one figure, namely Figure 2.

Although the meter may be attached to the wall in any way, one of the preferred ways is to attach a suspension bracket 130 to the back of the meter as by a screw 132 screwing into a post 134 provided for the purpose. For the sake of rigidity, the suspension link 130 may rest on a bar 136 and on the outer wall 18 of the meter, into either of which it may be countersunk to prevent twisting. The link 130 is provided with one or more key hole slots 138 which may be hooked over a screw in the wall.

In order to facilitate the formation of the cover attachment lugs 62, a bulge 140 may be formed in the outer wall 18. Likewise a cavity may be formed in the forward portion 40 of the wall 18, as at 142. This arrangement makes room for a mold member which is large enough to have adequate strength and firmness. In the case of the bulge 140 at the top of the meter, there is the incidental advantage that if for any reason it should be necessary to tighten or loosen the screw in the key hole slot 138 on which the meter is hanging, this may be done by inserting a screw driver through the bulge 140. It is to be understood that other attachment means may be provided, such as the holes 146 near the bottom of the meter base through which screws may be inserted.

The structure thus described provides a meter casing which is more nearly tamper-proof than any heretofore known, and which at the same time is exceedingly economical in construction and convenient in manufacture and use. It is to be understood that many other embodiments of the invention, including some in improved form, will be apparent, and in the course of time more will be devised by those skilled in the art. It is not desired that this invention be limited to the details described, for its scope includes all such forms or improvements as come within the spirit of the following claims, construed as broadly as the prior art will permit.

What is claimed is:

1. A casing for an electric meter including: a metallic meter base having a seat for a cover, and a removable cover seated on said seat; said base having a shoulder extending beyond said seat into said cover and close thereto to render more difficult access to said meter between said base and said cover.

2. A casing for an electric meter including: a metallic meter base having a seat for a cover, and a removable cover seated on said seat; said base having a shoulder extending beyond said seat into said cover and close thereto; and said cover having a flange extending beyond and close to the seat of said base to render more difficult access to said meter between said base and said cover.

3. A casing for an electric meter including: a metallic meter base having a seat for a cover, and a removable cover seated on said seat; said base having a shoulder extending beyond said seat into said cover and close thereto; said cover having a flange extending beyond and close to the seat of said base; and said base having a laterally extending flange against which the flange on said cover approximately seats.

4. A casing for an electric meter including: a metallic meter base having a seat for a cover, and a removable cover seated on said seat; said base having a shoulder inside of said seat extending into said cover and close thereto; said cover having a flange extending beyond and close to the seat of said base; and said base having a laterally and forwardly extending flange which extends close to the flange on said cover and on the opposite side thereof from said seat.

5. A casing for an electric meter comprising: a base member, and a cover; said base member telescoping within said cover and having a flange extending outwardly and around and telescoping over said cover.

6. A base for an electric meter having spaced inner and outer walls and having a laterally extending lug for attachment of a cover, and having a bulge in said outer wall adjacent to said lug; said bulge providing space large enough to accommodate a sturdy mold member in the formation of said lug and said inner wall reducing the vulnerability to access to the meter both through and adjacent to said bulge.

7. A casing for an electric meter including: a base, and a cover; said base having a cover-receiving seat and a laterally extending attachment lug, and said cover being seated on said seat and having a flange extending over and beyond said lug; a bayonet clamp secured to said cover within said flange and engaging said lug to secure said cover to said base; said bayonet clamp having a resilient bayonet member behind said lug and said flange having a shoulder positioned to limit the resilient movement of said bayonet member.

8. An electric meter including an element having an iron magnetic core and a coil located centrally on said core, and a metallic base having an outer wall and an inner wall located close to said coil and forming a partial housing therefor; said inner wall sloping at an angle which makes its drilling difficult from its extremity approximately to said iron core, and being extended to form a visible front wall substantially in contact with said core and a glass cover over said front wall and telescoped therebeyond and substantially in contact with said front wall.

9. A meter including a base and a glass cover, said base including a housing portion for a meter element, and a downward extension therefrom for housing the conductors, and including a double, spaced wall structure extending substantially continuously up along one side of the extension, around over the housing portion and down along the other side of the extension.

10. A meter including a base and a glass cover, said base including an element housing portion of rounded contour for housing a meter element and a conductor housing portion for housing the lead conductors and extending downwardly from points above the bottom of said element housing portion, the side walls of said base forming a double, spaced wall structure extending over the element housing portion and down on both sides thereof to the conductor housing portion and along its sides.

11. A meter including a base and a glass cover, said base including an element housing portion of rounded contour for housing a meter element and a conductor housing portion for housing the lead conductors and extending downwardly from points above the bottom of said element housing portion, the side walls of said base forming a double, spaced wall structure extending down on both sides of the element housing portion to the conductor housing portion and along its sides.

12. A meter including a base and a glass cover, said base including an element housing portion of rounded contour for housing a meter element, a terminal chamber, and a conductor housing portion connecting the terminal chamber and the element housing portion for housing the lead conductors, the side walls of said base forming a double, spaced wall structure extending over the element housing portion and down on both sides thereof to the conductor housing portion and along its sides.

13. An electric meter casing comprising a metallic base and a cover including a glass cover member shaped to enclose the portions of the meter element which stand out from that base, said metallic base having an outer wall and an inner wall having its portions closest to the outer wall spaced therefrom by a front wall substantially as far as the space requirements within the meter will permit, and sufficiently far to deter passing particles through both said walls, said inner wall sloping at an angle which makes its drilling difficult; and the space between said walls extending within the limits of said cover, and the said front wall extending radially inwardly from the cover, and being readily visible through said glass cover member.

14. An electric meter casing comprising a metallic base and a cover including a glass cover member shaped to enclose the portions of the meter element which stand out from that base, said metallic base having an outer wall and an inner wall having its portions closest to the outer wall spaced therefrom by a front wall sufficiently far to deter passing particles through both said walls, said inner wall sloping at an angle which makes its drilling difficult; and the space between said walls extending within the limits of said cover, and the said front wall extending radially inwardly from the cover and being readily visible through said glass cover member.

15. An electric meter including an element and an element housing portion having outer and inner side walls separated by a front wall and making entry at the sides of the element housing portion difficult, and a cover including a portion which telescopes over said spaced walls and said front wall, a terminal chamber formed as a part of said base beneath said cover and making entry within said cover at its bottom difficult, and an outstanding double walled structure extending upwardly between the ends of said terminal chamber and the element housing portion and outside of said cover to make entry between said terminal chamber and said front wall difficult.

16. A casing for an electric meter comprising: a base member, and a cover; said base member having a double, spaced side wall structure telescoping within said cover and having a flange extending outwardly and around and telescoping over said cover.

FREDERICK HOLMES.